United States Patent [19]

Lee et al.

[11] Patent Number: 5,472,388
[45] Date of Patent: Dec. 5, 1995

[54] ROTARY TO STEPLESS MOTION CONVERTER

[76] Inventors: Dong H. Lee, 5113 Ramsdell Ave., LaCrescenta, Calif. 91214; Myung-Ho Lee, 403-20 Seogyo-dong, Mapoku, Rep. of Korea; Hea S. Lee, 5113 Ramsdell Ave., LaCrescenta, Calif. 91214

[21] Appl. No.: 150,141
[22] PCT Filed: Dec. 19, 1991
[86] PCT No.: PCT/US91/09557
    § 371 Date: Dec. 1, 1994
    § 102(e) Date: Dec. 1, 1993
[51] Int. Cl.$^6$ .................................... F16H 15/08
[52] U.S. Cl. .................................... 476/54; 476/50
[58] Field of Search .................................... 476/50, 54

[56] References Cited

U.S. PATENT DOCUMENTS

| | | | |
|---|---|---|---|
| 1,000,881 | 8/1911 | Arnaud | 476/50 |
| 1,702,044 | 5/1927 | Flanders | 476/50 |
| 4,960,004 | 10/1990 | Hibi et al. | 74/200 |

*Primary Examiner*—Charles A. Marmor
*Assistant Examiner*—David Fenstermacher
*Attorney, Agent, or Firm*—Albert O. Cota

[57] ABSTRACT

A rotary to stepless motion converter that functions as a vehicle linear transmission (1). The converter consists of an upper rotating disc (11A) and lower rotating disc (11B) that are horizontally displaced and enclosed by an upper disc cover (15A) and a lower disc cover (15B). Between the two discs is located a counter-rotating shaft (14) that has attached a front transferrer wheel (13A) and a back transferee wheel (13B). The shaft front is attached to a vehicle engine (7) and the back to a drive shaft (2). When the front wheel (13A) is rotated, and the discs (11a), (11B) are centered, the two wheels remain stationary. When the lower disc (11A) moves in a +Y direction and the upper disc (11B) in a −Y direction, the two wheels move in a +X direction. Conversely, when the discs move in opposite directions, the two wheels move in a −X direction. The converter allows speed changes that are not detectable because the changes are continuous without momentary reductions in speed.

7 Claims, 6 Drawing Sheets

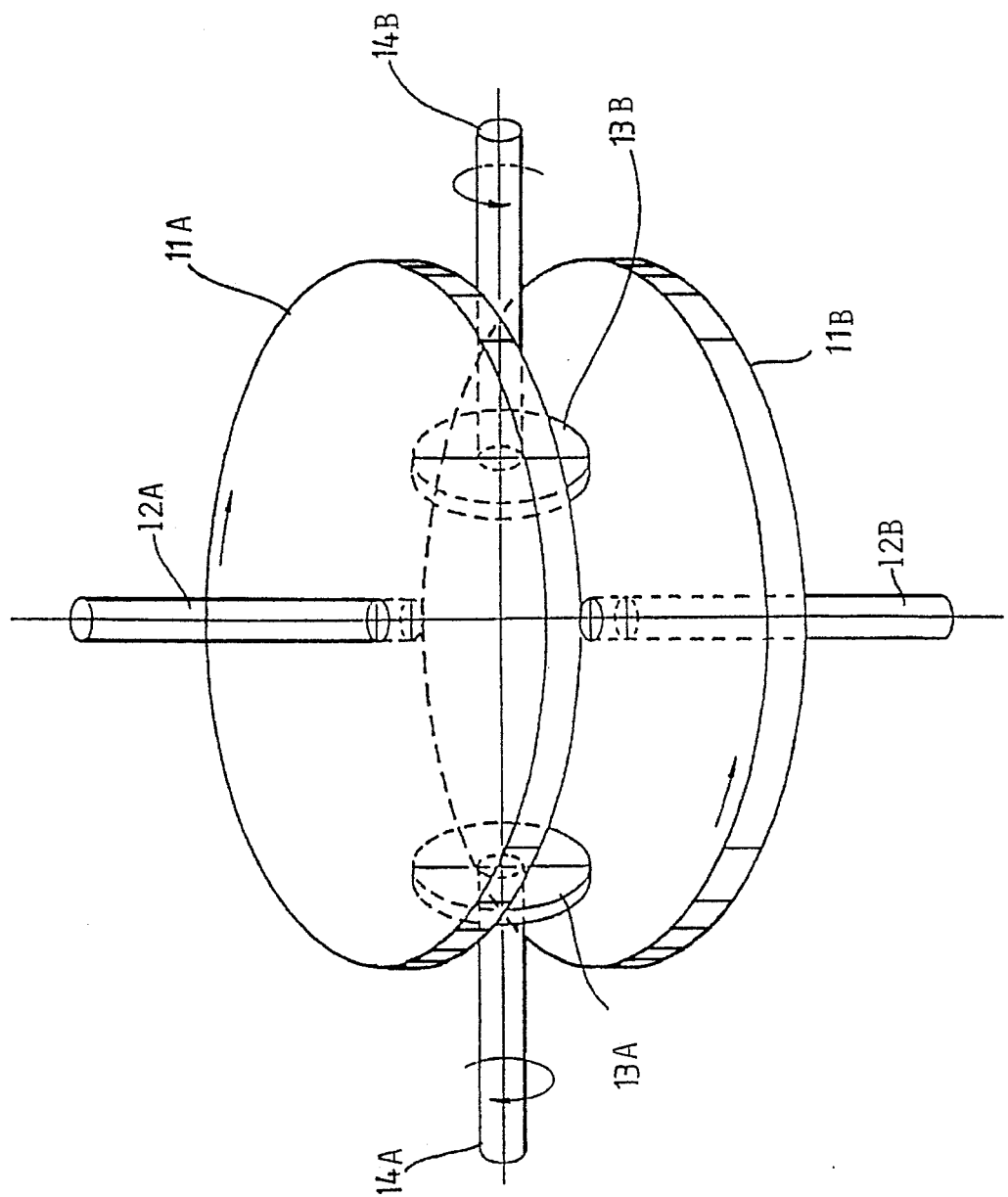

ROTARY TO STEPLESS MOTION CONVERTER

TECHNICAL FIELD

The invention pertains to the general field of rotary to stepless motion converters and more particularly to such a converter that can be employed as a vehicle transmission that provides a linear stepless gear change as the speed of the vehicle increases.

BACKGROUND ART

There are two types of vehicle transmission systems on the current market, automatic and manual shift transmissions. In a manual transmission, the driver changes gear positions in accordance with the engine RPM and acceleration. If the engine RPM does not correspond with the accelerating speed, the engine may hesitate and not operate properly.

An automatic transmission differs from the manual transmission in that the gear shifting is performed automatically. However, it is also very complicated and does not provide a feeling of controlled driving due to the inherent sudden gear changes. As shown in FIG. 1, there will be a change in speed as the location of the gear steps from a lower to a higher position. The purpose of this invention as shown in FIG. 2 is to eliminate these gear step changes and provide a smooth, linear speed progression as the vehicle accelerates.

A search of the prior art did not disclose any patents that read directly on the claims of the instant invention however, the following U.S. patents were considered related:

| U.S. Pat. No. | INVENTOR | ISSUED |
|---|---|---|
| 4,753,118 | Siller | 28 June 1988 |
| 4,542,670 | Borzym | 24 September 1985 |
| 2,660,065 | Williams | 24 November 1953 |

The Siller patent discloses a driving arrangement for a liquid metering pump. The pump includes a pump tappet mounted on a support for displacement in and opposite to a predetermined direction during a pumping and a return stroke. A restoring spring member urges the pump tappet opposite to the predetermined direction. The invention stores motor-originating energy during the return stroke of the pump tappet in the form of mechanical potential energy. The stored energy is then used during the pumping stroke for the enhancement of the motor output power.

The Borzym patent discloses a cutoff die set accelerator that uses a rotary to linear motion converter. The cutting die mechanism is driven by a threadless shaft and traveler assembly that is powered by a reversible DC motor. The die set position relative to the press is accurately monitored even in the presence of slip in the drive.

The Williams patent discloses a mechanism for changing rotary motion to oscillating motion. The mechanism includes a driving member having logistic engaging means that includes right and left hand logarithmic engagement members. A driving member having a central axis substantially perpendicular to the axis of rotation of the driving member and having helical engaging means is adapted to operably engage the logistic engaging means.

For background purposes and as indicative of the art to which the invention is related reference may be made to the remaining cited patents.

| U.S. Pat. No. | INVENTOR | ISSUED |
|---|---|---|
| 4,960,004 | Hibi etal | 2 October 1990 |
| 1,702,044 | Flanders | 27 May 1929 |
| 1,000,881 | Arnaud | 15 August 1911-- |

DISCLOSURE OF THE INVENTION

The rotary to stepless motion converter allows increasing or decreasing gear positions to be changed without the step changes present between each gear in conventional transmissions. That is, the converter functions as a stepless transmission. The invention has applicability in various gear changing systems. However, for the purpose of disclosure, the invention is described in terms of a linear transmission as would be employed in a vehicle.

As illustrated in FIG. 2, the linear transmission eliminates momentary losses of speed while accelerating from zero to a higher speed thus, resulting in a smooth vehicle acceleration. The invention also reduces manufacturing costs because less parts are required than for conventional transmissions. The linear transmission is particularly suitable for use as an efficient automatic transmission if an electronic controller such as a microprocessor in combination with a stepping motor and/or servo-motor is added. This automatic design eliminates gear shifting problems caused by unskilled drivers, and saves fuel costs because the engine RPM is automatically tuned to the load and torque of the engine.

The linear transmission consists of an assembly that includes upper and lower rotating discs that are housed within an enclosure consisting of upper and lower disc covers that are held in place by front and back wheel covers. The discs are horizontally placed with a certain distance between them in the enclosure. Two wheels; a front transferrer wheel and a back transferee wheel are installed vertically between the two rotating discs. The two wheels rotate about a counter-rotating shaft that includes a front wheel shaft section that protrudes through a bore in the front wheel cover and a back wheel shaft section that protrudes through a bore in the back wheel cover. The shafts are connected to a vehicle engine and a drive shaft respectively. The disc covers are installed to control the movement of the discs and to maintain a proper friction between the discs and the wheels. To assure a proper friction, a spring and/or a hydraulic device can be used to apply the force. The rotating wheels and the discs, are preferably coated with a polyplastic, natural rubber or any other high friction material to further assure the proper friction between the discs and the wheels.

When the front transferrer wheel is being rotated in a clockwise direction and the upper and lower rotating discs are placed in concentric alignment, that is centered, both the front transferrer wheel and back transferee wheel rotate in opposite directions and remain in a stationary position. If the lower rotating disc is moved in a +Y direction, the upper rotating disc will move a like distance in a −Y direction and the two wheels will simultaneously rotate in opposite directions and traverse across the discs in the +X direction. Likewise, if the lower disc is moved in the −Y direction, the upper disc will move in the +Y direction and the two wheels will simultaneously rotate in opposite directions and traverse across the discs in the −X direction.

The advantages of the present invention will become apparent from the subsequent detailed description of the

BRIEF DESCRIPTION OF THE DRAWINGS

FIG. 9 is a side plan view showing the upper and lower discs and the front and back wheels enclosed within the respective disc covers and wheel covers.

BEST MODE FOR CARRYING OUT THE INVENTION

Figure 1:
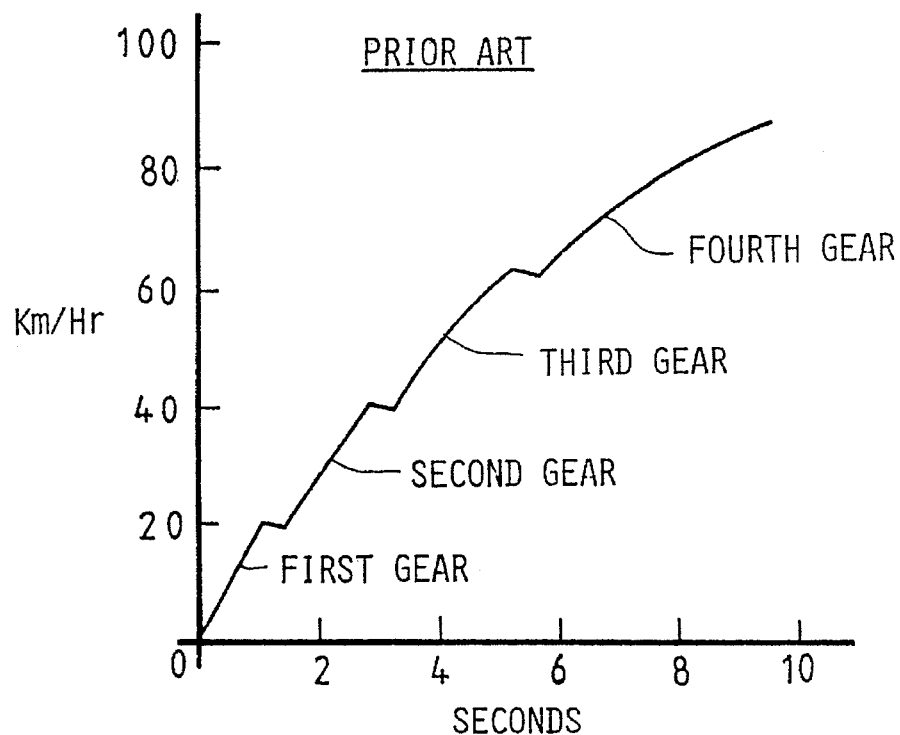
FIG. 1 is a plot diagram showing the typical gear shift steps that take place when shifting gears in a conventional vehicle transmission.
Figure 2:
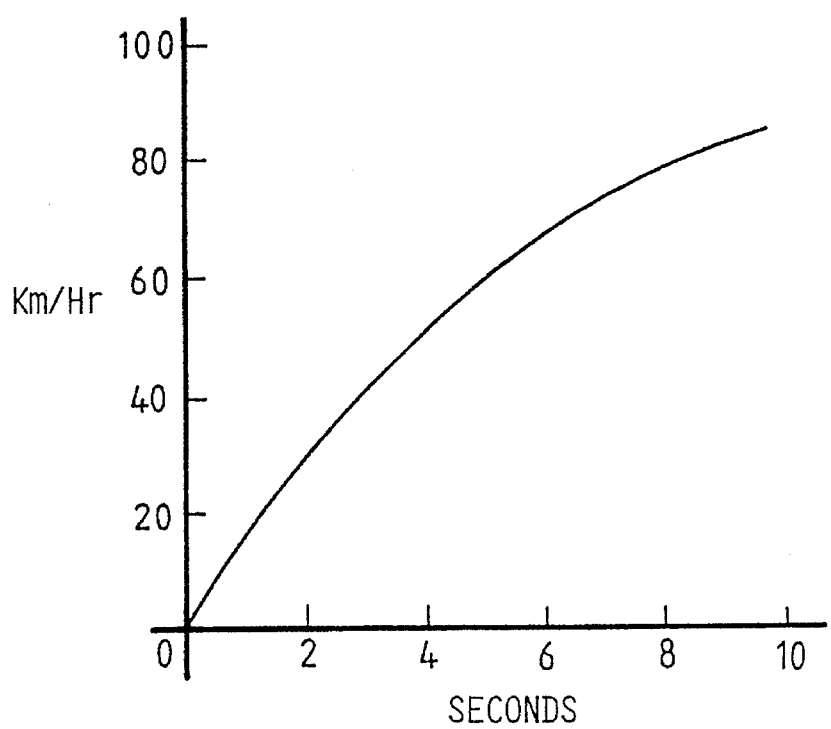
FIG. 2 is a plot diagram showing the elimination of the gear shift steps when using the linear transmission of the instant invention.

The best mode for carrying out the invention is presented in terms of a preferred embodiment that relates the rotary to stepless motion converter to a linear transmission 1 as would be employed in a vehicle. The linear transmission 1, as shown in FIGS. 1–11 is comprised of the following major elements: an upper rotating disc 11A, a lower rotating disc 11B, an upper disc shaft 12A, a lower disc shaft 12B, a front transferrer wheel 13A, a back transferee wheel 13B, a counter-rotating shaft 14 comprising a front wheel shaft section 14A and a back shaft section 14B, an upper disc cover 15A, a lower disc cover 15B, an inner cover plate 16, an outer cover 17, a front wheel cover 18A, a back wheel cover 18B and a disc position controller 20.

Figure 3:
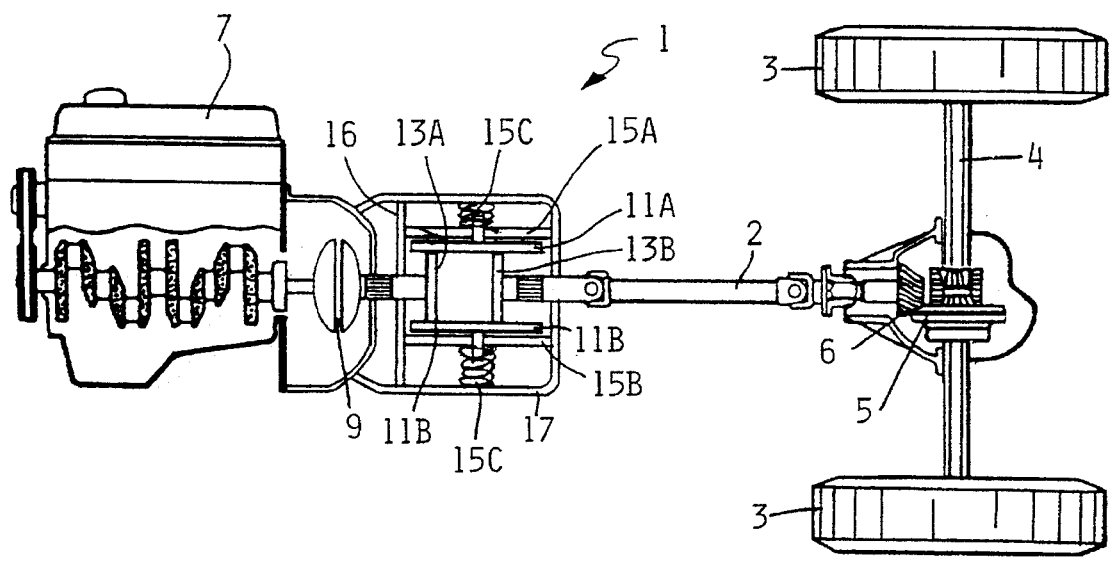
FIG. 3 is a cut away side view showing the invention as would be installed in a vehicle.
Figure 4:
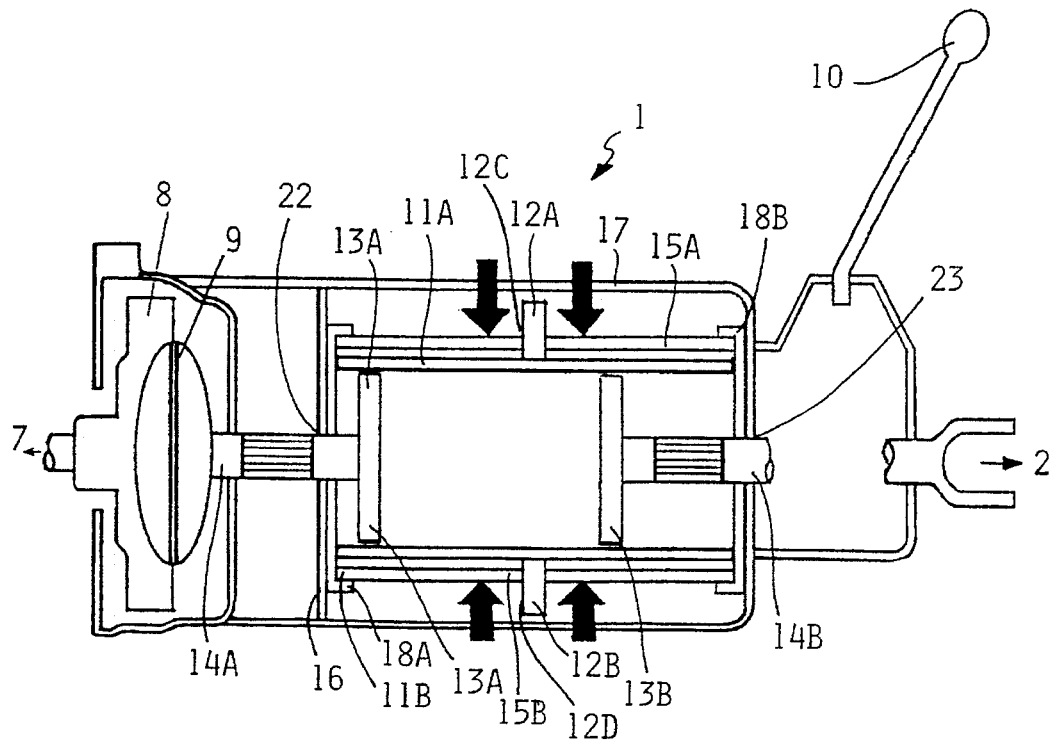
FIG. 4 is a cut away side view of the linear transmission as installed in FIG. 3.
Figure 9:
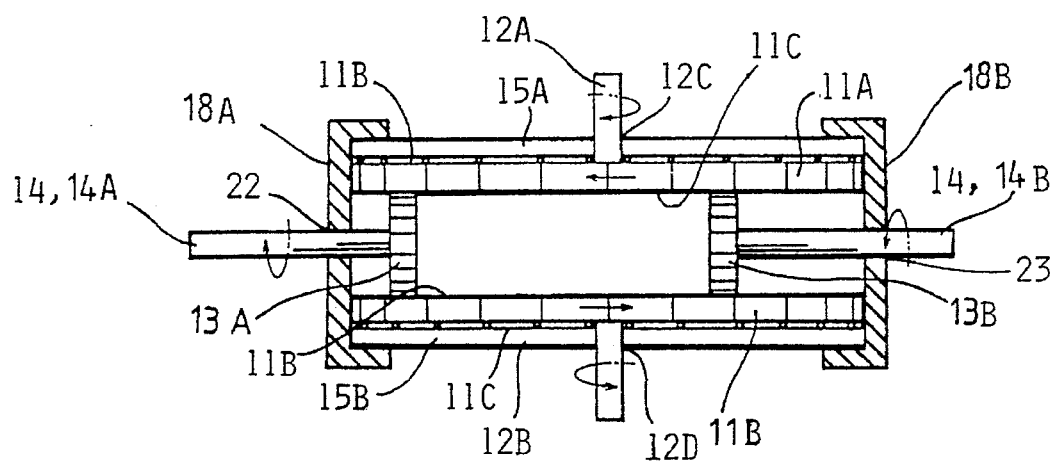
FIG. 9 is a perspective view showing the relationship of the upper and lower discs with the front transferrer wheel and the back transferee wheel.

In its basic configuration, the linear transmission 1 as shown in FIGS. 3, 4 and 9 is an assembly consisting of the front transferrer wheel 13A and the back transferee wheel 13B. The front wheel 13A is attached to the front wheel shaft section 14A and the back wheel 13B is attached to the back wheel shaft section 14B and both wheels are located vertically between the upper rotating disc 11A and the lower rotating disc 11B. The two discs rotate in opposite directions about an upper disc shaft 12A and a lower disc shaft 12B in accordance with the rotational direction of the front and back wheels 13A, 13B. The front wheel shaft section 14A is attached to a rotating means such as engine 7 via an oil clutch 9 or a torque converter 8. The back wheel shaft section 14B is attached to the wheel axle 4 via differential and reduction gears 5, 6 and the drive shaft 2.

Figure 11:
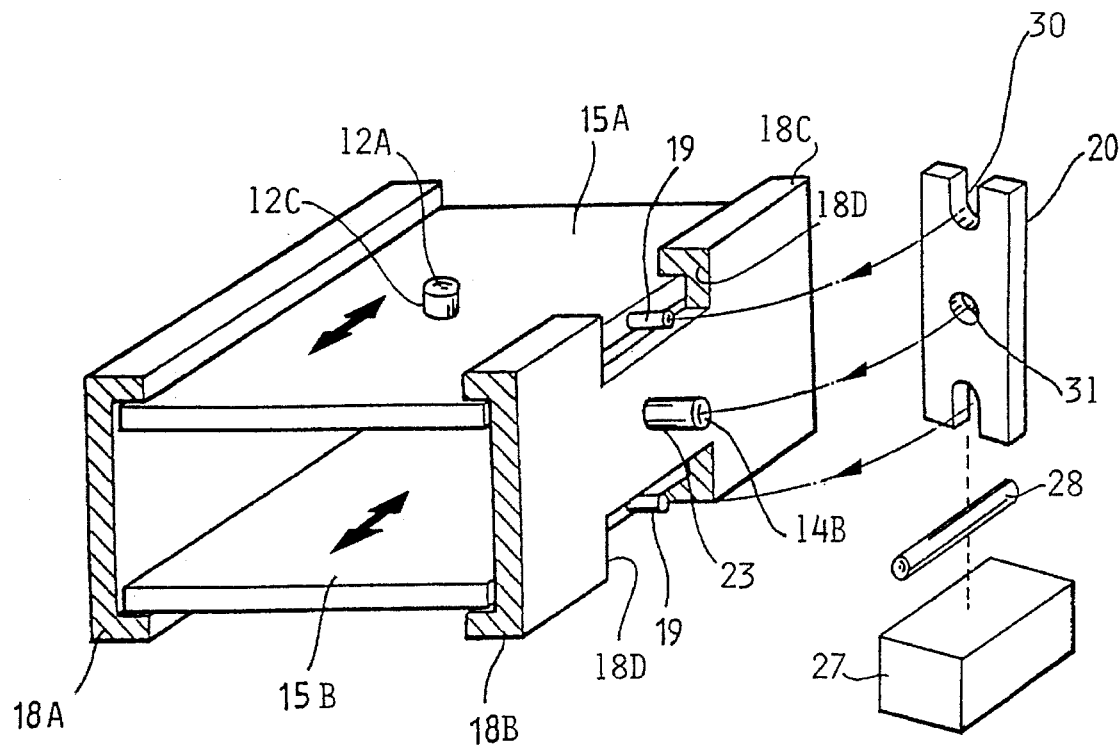
FIG. 11 is a perspective view showing how the upper and lower disc covers, front and back wheel covers and the control handle are assembled.

The upper and lower rotating discs 11A, 11B as shown in FIG. 9, each have an upper surface 11B and a lower surface 11C. Both of the discs 11A, 11B are enclosed by the upper disc cover 15A which includes an upper disc shaft bore 12C and the lower disc cover 15B which includes a lower disc shaft bore 12D. The discs are held in place by a front wheel cover 18A, a back wheel cover 18B and a side cover 18C. The front wheel cover includes a front wheel shaft bore 22 therethrough as shown in FIG. 9, and the back wheel cover as shown in FIG. 11, has a substantially centered notch 18D at its upper and lower surface and an outwardly projecting center pin 21. Each of the discs covers 15A, 15B has a guide pin 19 that extends outwardly from the back ends of the disc covers and that are substantially centered within the respective notch 18D on the back wheel cover 18B.

The opposite movement of the upper and lower disc covers 15A, 15B is controlled by the disc position controller 20 as shown in FIG. 11, that includes a pin slot 30 on each longitudinal end and a center pin bore 31. The slots and bore fit over the guide pins 19 and the center pin 21 respectively. When the controller 20 is rotated about the center pin 21 the upper and lower disc covers 15A, 15B move simultaneously in opposite directions as shown in FIG. 11. The movement of the controller may be effected by a manual means but preferably to provide more accurate control, by a vehicle-installed electronic control system 27. The system 27 is operated by a microprocessor that controls the operation of a stepping motor 28 which in turn, operates the disc position controller 20.

The linear transmission 1 is installed in a vehicle as shown in FIG. 3, by attaching the front shaft 14A to an engine 7 via an oil clutch 9. The back shaft 14B is coupled to the engine drive shaft 2 which drives the vehicle wheels 3 by means of a conventional wheel axle 4, differential gear 5 and a reduction gear 6. The entire assembly as shown in FIG. 4, is housed within a structure consisting of an inner cover plate 16 and an outer 17.

To operate properly, the friction between the upper and lower rotating discs 11A, 11B and the front and back wheels 13A, 13B must be maintained at a predetermined non-slipping force. This force is maintained by applying a force to the upper and lower disc covers 15A, 15B as shown by the arrows in FIG. 4. The force may be acquired by a hydraulic force not shown or preferably by a pair of springs 15c as shown in FIG. 3 that are inserted over the upper disc shaft 12A and the lower disc shaft 12B. The outer end of the springs are held in place by the outer cover 17.

When the upper and lower disc covers 15A, 15B move in a direction as shown by the arrows in FIG. 11, the upper and lower rotating discs 11A, 11B also move along with the cover in the same direction. Accordingly, if the upper and lower disc covers are moved in opposite directions, the upper and lower rotating discs 11A, 11B will also move in opposite directions. Also, the front transferrer wheel 13A and back transferee wheel 13B rotate in opposite directions.

OPERATION

Figure 7:
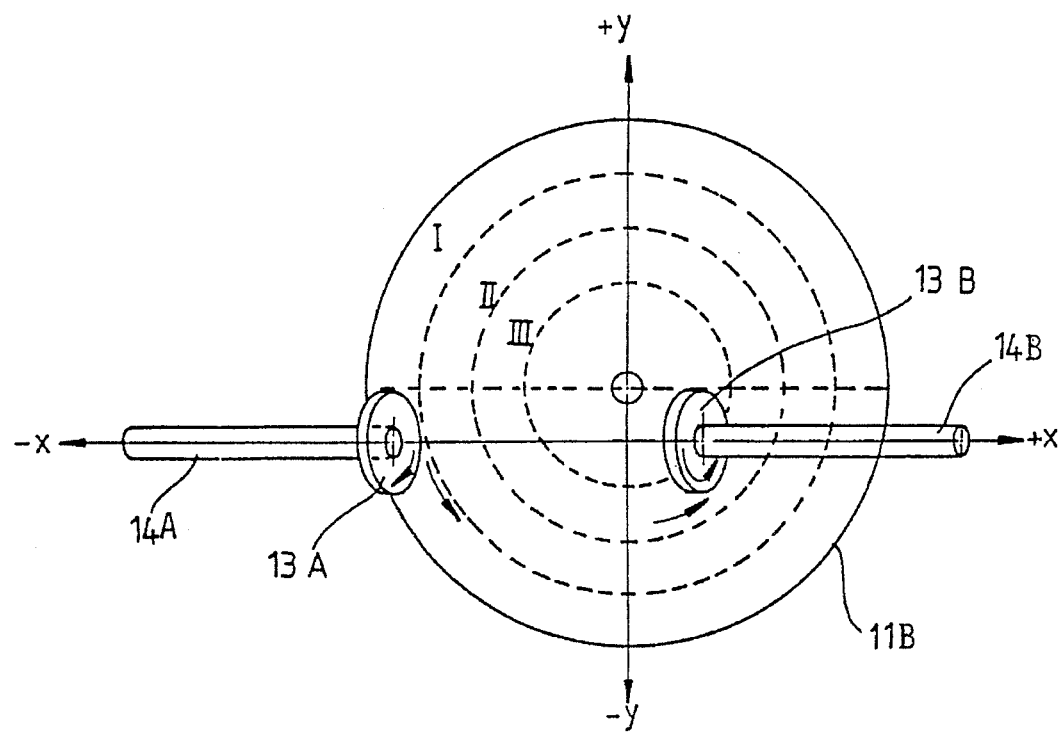
FIG. 7 is a conceptual top view showing the front transferrer wheel and the back transferee wheel off center from the disc.

The rotary to stepless motion converter as applicable to a linear transmission 1 as would be used in a vehicle, is operated by allowing the upper and lower discs 11A, 11B to momentarily move in opposite directions. The movement is accomplished by a shift lever that operates the disc position controller 20 by means of a microprocessor that controls the operation of a stepping motor. For example, as shown in FIGS. 7 and 10, if the lower disc 11B is moved in the +Y direction and the upper disc 11A is moved in the −Y direction the front transferrer wheel 13A and back transferee wheel 13B will simultaneously rotate in opposite directions and move to the +X direction while the wheel 13A is being rotated output of the wheel 13B is increased without changing the RPM of the engine and vice versa.

Figure 10:
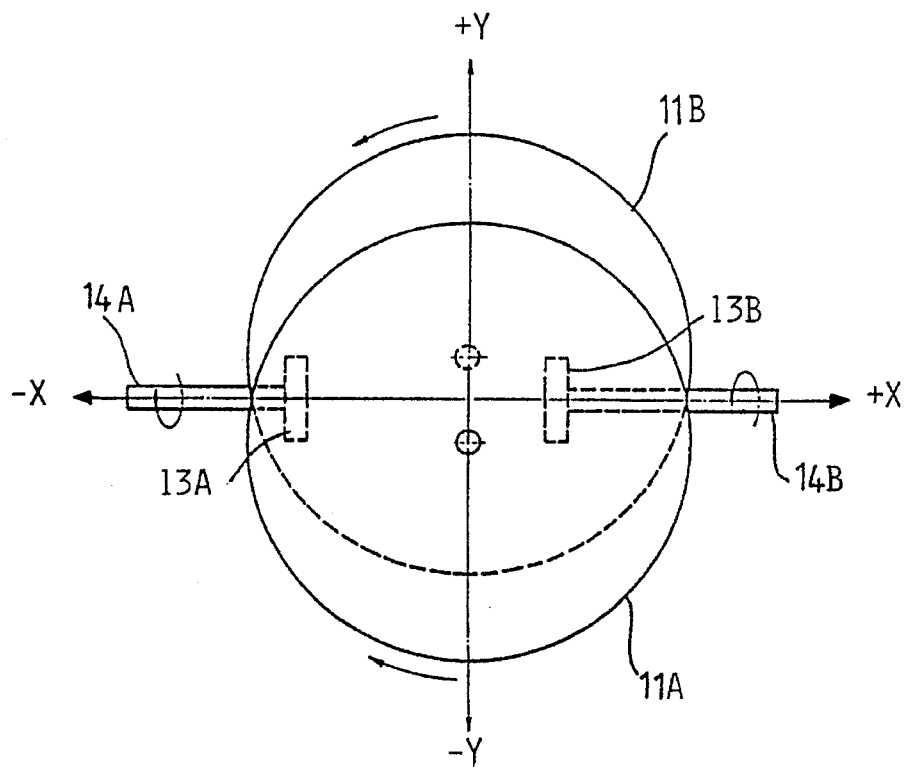
FIG. 10 is a conceptual view showing the relationship of the two shifted rotating discs with the front transferrer wheel and the back transferee wheel.

Conversely, if the lower rotating disc 11B is moved to the −Y direction as shown in FIG. 10, the upper rotating disc 11A will move in the +Y direction and transferrer and transferee wheels 13A, 13b will simultaneously move to the −X direction while the transferrer wheel is being rotated by the engine as shown in FIG. 10. Thus, the output RPM of the transferee wheel 13B is decreased without changing the engine RPM and vice versa. Both wheels 13A, 13B can be maintained at any position by placing the upper and lower rotating discs 11A, 11B in their center position, at which time the RPM of the wheel 13B remains constant.

Figure 5:
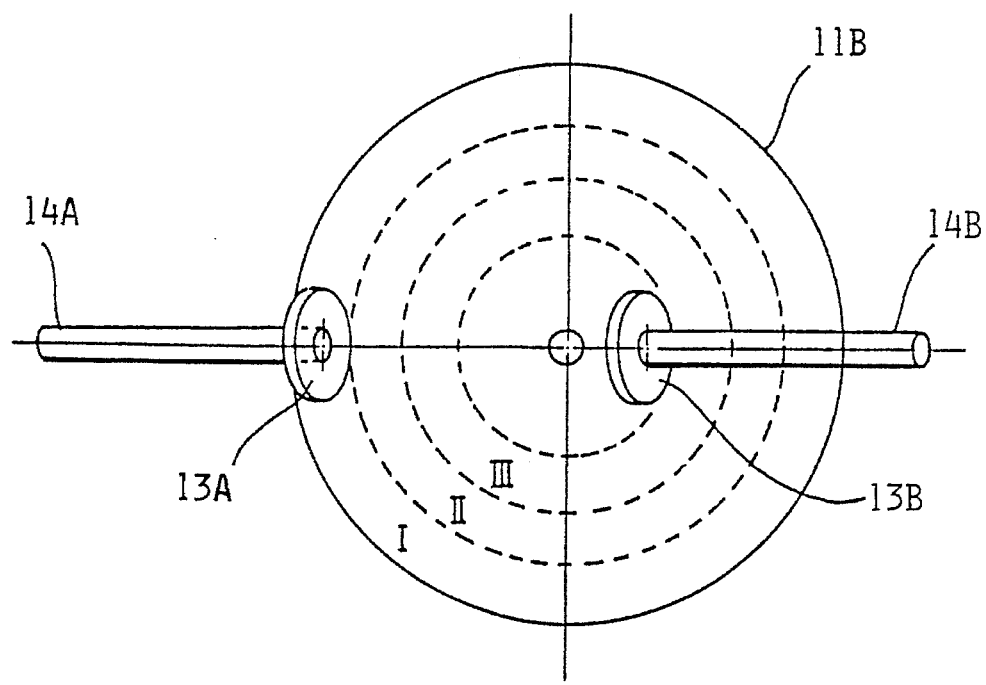
FIG. 5 is a conceptual top view showing the relationship of the lower disc with the front transferrer wheel and the back transferee wheel which are shown in their most forward position.

As shown in FIG. 5, the transferrer wheel 13A stands on disc 11B at track position I and the transferee wheel 13B stands on track position III. If the transferrer wheel 13A starts rotating after power is provided by the engine, the disc 11B will also rotate. Accordingly, the transferee wheel 13b will idle at its lowest output RPM at position III.

Figure 6:
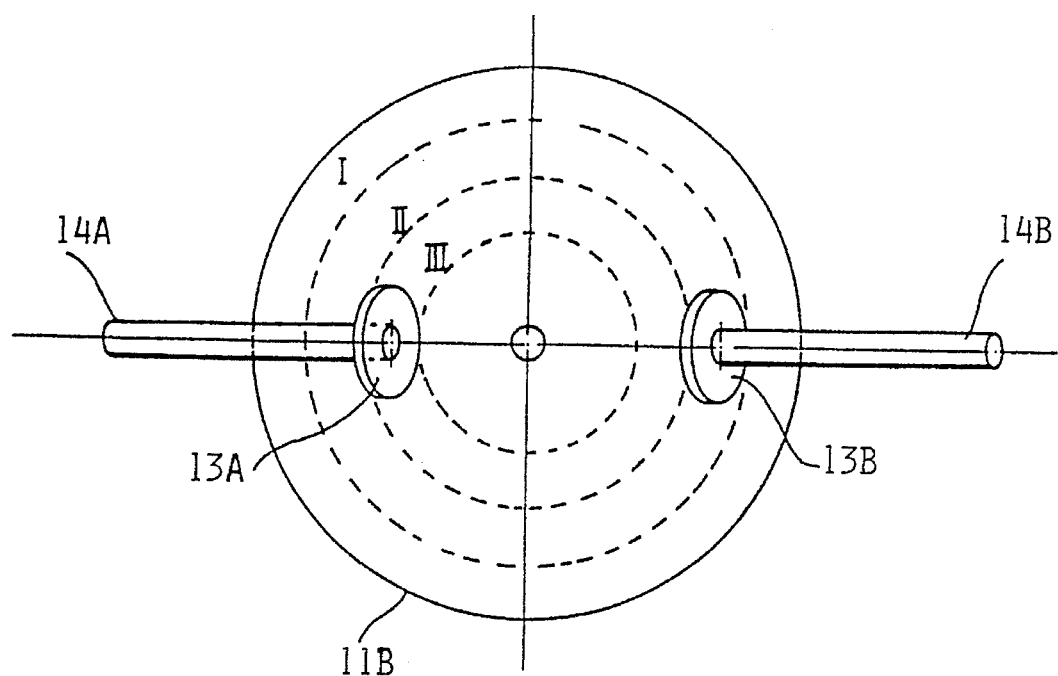
FIG. 6 is a conceptual top view showing the relationship of the lower disc with the front transferrer wheel and the back transferee wheel which are shown in their most backward position.

The RPM applicable to FIGS. 5 and 6 is computed as follows based on the following parameters:

The diameter of wheel 13A, 13B is 20 cm

The diameter of the disc 11B is 100 cm

The rotational speed of wheel 13A is 600 RPM

The speed of the disc 11B can be changed depending on the track position of the transferrer wheel 13A located on the disc 11B. If the wheel 13A rotates on track position I and the wheel 13B rotates on position III, the speed of disc 11B is calculated as follows:

$$\text{RPM of disc } 11B = \frac{\text{RPM of } 13A \times \text{diameter of } 13A}{\text{diameter of track position I}}$$
$$= \frac{600 \times 20}{80} = 150 \text{ RPM}$$

The speed of wheel 13B is calculated as follows:

$$\text{RPM of wheel } 13B = \frac{\text{RPM of disc } 11B \times \text{diameter of track position III}}{\text{diameter of wheel } 13B}$$
$$= \frac{150 \times 40}{20} = 300 \text{ RPM}$$

As shown in FIG. 6, if the wheel 13A rotates on track position III and wheel 13B rotates on track position I, the speed of the disc 11B is calculated as follows:

$$\text{RPM of disc } 11B = \frac{\text{RPM of } 13A \times \text{diameter of } 13A}{\text{diameter of track position III}}$$
$$= \frac{600 \times 20}{40} = 300 \text{ RPM}$$

The speed of wheel 13B is calculated as follows:

$$\text{RPM of wheel } 13B = \frac{\text{RPM of disc } 11B \times \text{diameter of track position I}}{\text{diameter of wheel } 13B}$$
$$= \frac{300 \times 80}{20} = 1200 \text{ RPM}$$

In summary, as shown in FIGS. 5 and 6, the speed of disc 11A, 11B rotating with the wheels, is faster when wheel 13A is moved toward the center of the disc because the dynamic diameter of the track position gets smaller. Also, the speed of the wheel 13B will be faster as it moves outwardly from the center of the discs 11A, 11B. Therefore, the vehicles speed can be controlled steplessly by moving the position of the two wheels on the discs.

As shown in FIGS. 5 and 10, wheel 13A is in track position I and wheel 13B in track position III. If the lower disc 11B is moved toward the +Y direction and the upper disc toward the −Y direction as shown in FIG. 10, while the wheel 13A is rotating at 600 RPM, the speed of wheel 13B commences at 300 RPM. However, both wheels will move toward the +X direction without pushing or pulling the shaft while the speed of wheel 13A is maintained at 600 RPM. However, the speed of wheel 13B increases continuously up to the maximum 1200 RPM as previously calculated.

When wheel 13A reaches track position III and wheel 13B reaches track position I as shown in FIG. 6, the speed of the transferee wheel 13B reaches 1200 RPM. In order to reduce the speed of the transferee wheel 13B, the lower disc 11B as shown in FIG. 10, is moved toward the −Y direction while the upper disc 11A is moved toward the +Y direction. This enables both wheels to move back to their original track position I and III respectively as shown in FIG. 5.

The most convenient way to place both wheels at their desired positions is to move both discs in opposite directions by moving the disc covers 15A, 15B in opposite directions to each other as shown in FIG. 11. To assure this operation, the wheel shaft or wheel can be moved slightly by the aid of a separate auxiliary device not shown.

FIG. 4 shows a conventional transmission replaced by the inventive linear transmission 1. When shift lever 10 is in neutral position, the oil clutch 9 is open and the power of engine 7 is not delivered to the drive shaft 2. If the lever is placed at the forward position, the oil clutch 9 is connected and the engine power is delivered to the drive shaft 2. The use of an oil clutch 9 reduces the possibility of malfunctioning by giving too much power instantly to the linear transmission. The oil serves as a buffer to provide a dampening effect when engine power changes drastically.

In summary, the changes in speed are not detected by the driver because the changes are made continuously from zero to any desired speed, without momentary reduction in speed. This results in improved driving, a reduction in the number of parts compared to conventional transmissions, fewer costs in manufacturing and maintenance, and improved fuel consumption by matching the engine speed in accordance with the optimal load condition.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

I claim:

1. A rotary to stepless motion converter comprising an upper and lower rotating disc rotatably attached to an upper disc cover and a lower disc cover respectively, where said rotating discs are horizontally displaced and have a front transferror wheel and a back transferee wheel installed vertically and that rotate about a counter-rotating wheel shaft that is rotatably attached to a front and back wheel cover, where one end of the wheel shaft is connected to an engine and the other wheel shaft end is connected to an engine drive shaft, where the movement of said upper and lower rotating discs is controlled by said upper and lower disc covers that also maintain the proper friction between said wheels and said upper and lower rotating discs, and where the simultaneously movement of said upper and lower disc covers is provided by a disc position controller that is pivotally attached to said covers wherein by moving said upper and lower rotating discs in opposite directions when power is connected, the front transferrer wheel will move to the center of said rotating discs and said back transferee wheel moves away from the center said rotating discs.

2. A rotary to stepless motion converter comprising:
   a) a front wheel cover having a front wheel shaft bore therethrough,
   b) a back wheel cover having a back wheel shaft bore therethrough,
   c) an upper disc cover having an upper disc shaft bore therethrough and movably attached to the upper edges of said front and back wheel covers,
   d) a lower disc cover having a lower disc shaft bore therethrough and movably attached to the lower edges of said front and back wheel covers,
   e) means for simultaneously moving said upper and lower disc covers in opposite directions, where said movement includes a center position, an incremental movement in the +Y direction and an incremental movement in the −Y direction,
   f) an upper rotating disc having a lower surface and an upper surface with a fixed upper disc shaft that is sized to rotatably fit into said upper disc shaft bore,
   g) a lower rotating disc having an upper surface and a lower surface with a fixed lower disc shaft that is sized to rotatably fit into said lower disc shaft bore,
   h) a counter-rotating shaft comprising a front wheel shaft section sized to rotatably fit into and extend through the front wheel shaft bore and a back wheel shaft section sized to rotatably fit into and extend through the back wheel shaft bore,
   i) means to apply a rotational force to said front wheel shaft section,
   j) a front transferrer wheel attached to the front wheel shaft section and having its wheel perimeter frictionally touching the lower surface of said upper rotating disc and the upper surface of said lower rotating disc, and
   k) a back transferee wheel attached to the back wheel shaft section and having its wheel perimeter frictionally touching the lower surface of said upper rotating disc and the upper surface of said lower rotating disc, where when said front wheel shaft is rotated in a clockwise direction and said upper and lower disc covers are placed in their center position said wheels rotate in opposite directions and remain in a stationary position, and when said lower rotating disc is moved in the +Y direction and said upper rotating disc is moved in the −Y direction, said wheels simultaneously rotate in opposite directions and traverse across said discs in the +X direction, and when said upper rotating disc is moved in the −Y direction and said lower rotating disc is moved in the +Y direction said wheels simultaneously rotate in opposite directions and traverse across said discs in the −X direction.

3. The converter as specified in claim 2 wherein said means for simultaneously moving said upper and lower disc covers in opposite directions comprises:
   a) a back wheel cover having a substantially centered notch at its upper and lower surface and an outwardly projecting center pin,
   b) a guide pin extending outwardly from the back end of said upper and lower disc cover, where said pins are substantially centered within the respective notch on said back wheel cover when said discs are in their center position, and
   c) a disc position controller having a pin slot on each longitudinal end and a center pin bore, wherein said pin slots and center pin bore are sized to fit the guide pins and the center pin respectively, where when said controller is rotated about the center pin said upper and lower disc covers move simultaneously in opposite directions.

4. The converter as specified in claim 3 wherein the movement of said disc position controller is controlled by a stepping motor that is operated by a vehicle-installed electronic system.

5. The converter as specified in claim 2 further comprising a spring inserted over said upper disc shaft and said lower disc shaft where the outer end of said springs is held in place by an outer cover that in combination with in inner cover plate houses said converter where said spring applies a force to said upper and lower discs to maintain a predetermined non-slipping force to said front transferrer and back transferee wheels.

6. A rotary to stepless motion converter comprising:
   a) a front wheel cover having a front wheel shaft bore therethrough,
   b) a back wheel cover having a back wheel shaft bore therethrough,
   c) an upper disc cover having an upper disc shaft bore therethrough and movably attached to the upper edges of said front and back wheel covers,
   d) a lower disc cover having a lower disc shaft bore therethrough and movably attached to the lower edges of said front and back wheel covers,
   e) means for simultaneously moving said upper and lower disc covers in opposite directions, where said movement includes a center position, an incremental movement in the +Y direction and an incremental movement in the −Y direction,
   f) an upper rotating disc having a lower surface and an upper surface with a fixed upper disc shaft that is sized to rotatably fit into said upper disc shaft bore,
   g) a lower rotating disc having an upper surface and a lower surface with a fixed lower disc shaft that is sized to rotatably fit into said lower disc shaft bore,
   h) a counter-rotating shaft comprising a front wheel shaft section sized to rotatably fit into and extend through the front wheel shaft bore and a back wheel shaft section sized to rotatably fit into and extend through the back wheel shaft bore,
   i) a rotational force applied to said front wheel shaft section by a vehicle engine,
   j) a front transferrer wheel attached to the front wheel shaft section and having its wheel perimeter frictionally touching the lower surface of said upper rotating disc and the upper surface of said lower rotating disc, and k) a back transferee wheel attached to the back wheel shaft section and having its wheel perimeter frictionally touching the lower surface of said upper rotating disc and the upper surface of said lower rotating disc, where when said front wheel shaft is rotated in a clockwise direction and said upper and lower disc covers are placed in their center position said wheels rotate in opposite directions and remain in a stationary position, and when said lower rotating disc is moved in the +Y direction and said upper rotating disc is moved in the −Y direction, said wheels simultaneously rotate in opposite directions and traverse across said discs in the +X direction, and when said upper rotating disc is moved in the −Y direction and said lower rotating disc is moved in the +Y direction said wheels simultaneously rotate in opposite directions and traverse across said discs in the −X direction.

7. A rotary to stepless motion converter comprising:

a) a front wheel cover having a front wheel shaft bore therethrough, b) a back wheel cover having a back wheel shaft bore therethrough, c) an upper disc cover having an upper disc shaft bore therethrough and movably attached to the upper edges of said front and back wheel covers, d) a lower disc cover having a lower disc shaft bore therethrough and movably attached to the lower edges of said front and back wheel covers, e) means for simultaneously moving said upper and lower disc covers in opposite directions, where said movement includes a center position, an incremental movement in the +Y direction and an incremental movement in the −Y direction, f) an upper rotating disc having a lower surface and an upper surface with a fixed upper disc shaft that is sized to rotatably fit into said upper disc shaft bore, g) a lower rotating disc having an upper surface and a lower surface with a fixed lower disc shaft that is sized to rotatably fit into said lower disc shaft bore, h) a counter-rotating shaft comprising a front wheel shaft section sized to rotatably fit into and extend through the front wheel shaft bore and a back wheel shaft section sized to rotatably fit into and extend through the back wheel shaft bore, i) means to apply a rotational force to said front wheel shaft section, j) a front transferrer wheel attached to the front wheel shaft section and having its wheel perimeter frictionally touching the lower surface of said upper rotating disc and the upper surface of said lower rotating disc, and k) a back transferee wheel attached to the back wheel shaft section and having its wheel perimeter frictionally touching the lower surface of said upper rotating disc and the upper surface of said lower rotating disc, where when said front wheel shaft is rotated in a clockwise direction and said upper and lower disc covers are placed in their center position said wheels rotate in opposite directions and remain in a stationary position, and when said lower rotating disc is moved in the +Y direction and said upper rotating disc is moved in the −Y direction, said wheels simultaneously rotate in opposite directions and traverse across said discs in the +X direction, and when said upper rotating disc is moved in the −Y direction and said lower rotating disc is moved in the +Y direction said wheels simultaneously rotate in opposite directions and traverse across said discs in the −X direction, wherein the speed of said upper and lower rotating discs is faster when said front transferrer wheel is moved toward the center of said discs because the dynamic diameter of the disc is smaller, likewise the speed of said back transferee wheel is faster as it moves outwardly from the center of said discs.

\* \* \* \* \*